Nov. 26, 1963 K. S. O. FORSBERG 3,112,021

HOT ROLLED MATERIAL STEERING DEVICE

Filed April 8, 1960 10 Sheets-Sheet 1

Nov. 26, 1963 K. S. O. FORSBERG 3,112,021

HOT ROLLED MATERIAL STEERING DEVICE

Filed April 8, 1960 10 Sheets-Sheet 2

Nov. 26, 1963 K. S. O. FORSBERG 3,112,021

HOT ROLLED MATERIAL STEERING DEVICE

Filed April 8, 1960 10 Sheets-Sheet 3

Nov. 26, 1963 K. S. O. FORSBERG 3,112,021

HOT ROLLED MATERIAL STEERING DEVICE

Filed April 8, 1960

10 Sheets-Sheet 4

Nov. 26, 1963 K. S. O. FORSBERG 3,112,021

HOT ROLLED MATERIAL STEERING DEVICE

Filed April 8, 1960 10 Sheets-Sheet 7

Nov. 26, 1963 K. S. O. FORSBERG 3,112,021

HOT ROLLED MATERIAL STEERING DEVICE

Filed April 8, 1960 10 Sheets-Sheet 8

United States Patent Office 3,112,021
Patented Nov. 26, 1963

3,112,021
HOT ROLLED MATERIAL STEERING DEVICE

Karl Sten Olof Forsberg, Ljusasen, Morgardshammar, Sweden, assignor to Morgardshammars Mekaniska Verkstads Aktiebolag, Morgardshammar, Sweden, a joint-stock company of Sweden Filed Apr. 8, 1960, Ser. No. 20,850
Claims priority, application Sweden Apr. 11, 1959
1 Claim. (Cl. 198—24)

This invention relates to a method of guiding the full length of hot rolling material or a section thereof on a delivery roller table and conveying it to a cooling bed and to a device for carrying out the method.

During recent years, various attempts were made to raise the output of rolling mills by increasing the rolling speeds. Delivery roller tables adapted to receive hot material with speeds higher than about 10 m./s. for 6 mm. $\phi$ or about 12m./s. for 8 mm. $\phi$ or for corresponding dimensions of other cross-sections did not exist heretofore. The same is, of course, true with dimensions greater or smaller than the indicated ones. It is true that rolling speeds of up to 14–15 m./s. were achieved, but owing to the construction of the delivery roller tables there was easy formation of waste so that the output was reduced. As a serious disadvantage of most of the known delivery roller table constructions must be mentioned that they include a grave risk of accidents. Such accidents occur due to the fact that the hot material which runs freely on the delivery roller table is caused to change its direction off the table or above the cooling bed when its front portion meets unexpected resistance so that at such high speeds of the material a person standing near the table or at any place close to the cooling bed cannot reach a place of safety. It is characteristic for said hot rolling material that its free end appears at the cooling bed very much like a projectile, while contrary thereto hot material with scrap formation in the mill forms "sloops" having a speed only about half as high as the rolling speed. Furthermore, said "sloops" do not constitute such a great dangerous moment because they do not have that piercing force as the front portion of said hot material.

According to other known constructions of delivery roller tables to cooling beds, for example as described in German Patent 923,963, the hot material runs through channels where it is braked to standstill. Said device renders it possible to roll thin dimensions with relatively high speed without constituting a risk from a safety point of view. Owing to the fact however, that in view of the braking effect and the length between the end pair and the cooling bed a certain constant rolling speed must be maintained, the device is only advantageous in connection with the thinnest dimensions. There further is a limitation wtih regard to the length of the section cut from the hot material because the greater the length of the section the greater the frictional forces, so that at a certain length of the section the frictional forces will exceed the pushing force from the mill. As a further disadvantage of the device according to the above German patent can be mentioned that the device is constructed as a separate unit mounted on the side of the delivery roller table, thus complicating the communication possibilities and narrowing the access to the cooling bed.

The present invention eliminates the drawbacks of the known constructions and is owing to its universality adapted to be applied to rolling thin dimensions at high speeds as well as thick dimensions at lower speeds. Because of its simple construction and universality of application the device according to the invention is also competitive from a cost point of view.

The method according to the present invention is substantially characterized in that the rolling material or a section thereof is directed into closed channel sections placed immediately adjacent to each other and guided within the same, and that the hot rolling material or a section thereof in the channel section in question after the run-out period is braked to standstill and thereafter delivered to the cooling bed.

According to an embodiment of the present invention, the hot rolling material or a section thereof is guided during its run-out by the rollers of the delivery roller table and by a channel defined by an inclined upper wall a lower wall and a substantially vertical rear wall of a channel forming member in cooperation with the rear surface of the rear wall of an adjacent channel forming member (or, in cooperation with a generally vertical rear wall of a stationary slide member) said hot rolling material or a section thereof thereafter is braked in such a manner that the channel forming members are raised so much that the channel bottoms are in the same plane as or somewhat above the roller top so that the hot rolling material or a section thereof is substantially guided by the channel forming members and by said vertical wall, said hot rolling material or a section thereof finally being conveyed to the cooling bed in such a manner that said channels are released from the rear side of the adjacent channel forming member or the vertical portion of the stationary slide member by raising the channel forming member to be emptied in order to render the hot rolling material or a section thereof possible to slide or roll down to the cooling bed. In its apparatus aspect, the invention is concerned with apparatus for manipulating hot rolling material on a delivery roller table and for conveying the same to a cooling bed which is in generally side by side relationship to said delivery roller table. The hot rolling material, during its run-out, is directed into a channel defined by a channel forming member, providing an inclined upper wall, a bottom wall and a substantially vertical rear wall of such channel, in cooperation with the rear surface of an adjacent channel forming member. The discharge side of the channel is opposite the rear wall of the channel forming member. A plurality of these channel forming members, in side by side relationship, are mounted for relatively vertical displacement to raise and lower said members in succession thereby to selectively open and close the discharge sides of said channels in succession and to discharge hot rolling material from within each channel when opened, for downwardly inclined movement laterally and across the inclined top wall or walls of the adjacent channel forming member or members and onto the cooling bed.

In a preferred embodiment, said channel forming members are of arcuate configuration and a plurality of them are nested against each other in a concentric arrangement and are rotatable about a common axis coincident to their common center of curvature. In this embodiment, also, the discharge side of each channel is toward the cooling bed, and the top walls of the channels of the set are in line with each other and are inclined toward said cooling bed.

When rolling thin dimensions, the hot rolling material is directed during its run-out into channels provided in the channel forming members. In that case the substantially vertical wall is a side limiting surface in the channel formed by a hollow in the channel forming member and by the rear side of the adjacent channel forming member or the substantially vertical portion of a slide member so that in the closed channel sections guiding of the material is obtained and that for conveying the material to the cooling bed the channels are released from the rear side of the adjacent channel forming member or the slide member by raising the channel forming member to be emptied. During the run-out period of the material the channel bottoms are adjusted to lie below the roller top level. When rolling very thin dimensions (for example 50 x 2 mm. flat) with high speeds, the channel forming members must be adjusted in such a manner that the channel bottoms lie only a fraction of a millimeter below the roller top level. During the braking period, the channel forming members are substantially raised as much above the roller top level as they during the run-out period were below the same, as long as the speed is high. The rollers serve only for guiding the end portion of the hot material. During normal rolling operation, for example when rolling 8 mm. $\phi$ at high speeds, the channel bottom may during the run-out period lie on a lower level because in that case it is not necessary to steer the end portion of the hot material by means other than the driven rollers, and during the braking period the channel bottom may lie on a higher level, in view of the fact that such hot rolling material is more compact and does not show such a great tendency of bending downward as thin dimensions.

When rolling thin or medium dimensions, the run-out and the braking may occur above the channel forming members, the material in that case running out all the time above the same channel forming member, for example above the outermost one. This embodiment is characterized in that when the braking is commenced the adjacent channel forming member is lowered below the roller top so that the hot material or a section thereof is transferred to said channel forming member which thereafter is raised for partial braking, that then the next following channel forming member is lowered to the level of the preceding channel forming member and thereafter raised one step for partial braking, etc. according to the number of channel forming members utilized.

When rolling thick and particularly wide and flat dimensions, the hot material also runs out and is braked above the channel forming members. This embodiment of using the channel forming members is characterized in that the hot rolling material or a section thereof is directed above two or more channel forming members and that the channel forming members (two or more) ahead of these channel forming members are lowered to get up the material or a section thereof whereafter said last-mentioned channel forming members are raised again for full or partial braking.

The device preferably applied to carrying out the above described method of guiding hot rolling material or a section thereof on a delivery roller table and conveying to the cooling bed is substantially characterized in that said delivery roller table comprises rollers preferably arranged in an inclined, oblique or conical manner, further that channel forming members to be raised and lowered individually are arranged immediately adjacent to each other in the gaps between substantially all of the rollers, that said channel forming members are designed in such a manner that they together with the adjacent channel forming member or the substantially vertical portion of a slab form channels, and that the upper surface of said channel forming members are shaped in such a manner that they can serve for guiding the hot rolling material.

The channel forming members of the device are preferably designed to have one or a plurality of hollows being open toward the cooling bed and limited by a top, a bottom and a side wall in such a manner that the rear side of the side wall of the adjacent channel forming member completes the open hollow so that a closed channel section is formed. The channel forming members are preferably pivoted, the rear side of the channel forming members having arc-shape. The entirely or partially open front side of the channel forming members (i.e. the side facing the cooling bed) corresponds as to form to the rear side of the adjacent channel forming member. The channel forming members are raised and lowered by means of a lever system.

According to an embodiment of the invention, the surfaces of the channel forming members intended for guiding the hot material or a section thereof are plane. In view of the fact that the material is guided by the rear side of the channel forming members, said surface is arc-shaped (convex or concave) when the channel forming members are pivoted. However, the portion of the rear side of the channel forming members which actually guides the material is of such a relatively small width that this portion can be considered to be substantially plane.

It is previously known through German Patent 762,843 to use a system of channel forming members on the delivery roller table for rolling wide flat dimensions. Said system of channel forming members comprises three channels arranged above each other in such a manner that the hot material, when it runs out of the mill is divided into three portions, each portion running in its channel. After the third and last portion is delivered to the cooling bed, the system of channel forming members is lowered for getting up another hot material. Said device allows only the rolling of wide flat dimensions at moderate speeds. If the cooling bed is of considerable length, the hot rolling material can be rolled in great weights. The maximum length of the hot rolling material must not exceed three times the length of the cooling bed.

It further is previously known through German Patent 534,696 to roll thin dimensions by using a system of channel forming members on the delivery roller table comprising raisable and lowerable channel forming members in laterally adjacent position and provided with a stationary wall between each channel forming member. After the run-out period of the material, the channel forming members are raised for braking and delivering the material to the cooling bed. This device renders possible the rolling of thin dimensions at moderate speeds and of high weights of hot material with relatively short cooling beds.

The device according to the invention distinguishes over the aforementioned known devices in the following points:

(1) The device can be applied in a universal manner to a wide range of dimensions. When changing from rolling thin dimensions to rolling thick dimensions, no special measures for adjusting the system of channel forming members are required.

(2) The method and the device render possible the rolling of very thin dimensions (down to 2 mm.) at extremely high speeds owing to the special adjustment system of the channel forming members and the guiding of the material during its run-out and commencing (partial) braking period.

(3) The method and the device allow the rolling at higher speeds than it was heretofore possible with the known devices using variable speeds for corresponding dimensions.

(4) The method and the device—in agreement with the device according to German Patent 534,696 but in contrast to the device according to German Patent 762,843—render it possible to roll high weights of hot material while maintaining relatively short cooling beds and at the same time applying high rolling speeds.

The invention is described in the following by way of several embodiments, reference being had to the accompanying drawings.

Figure 1:
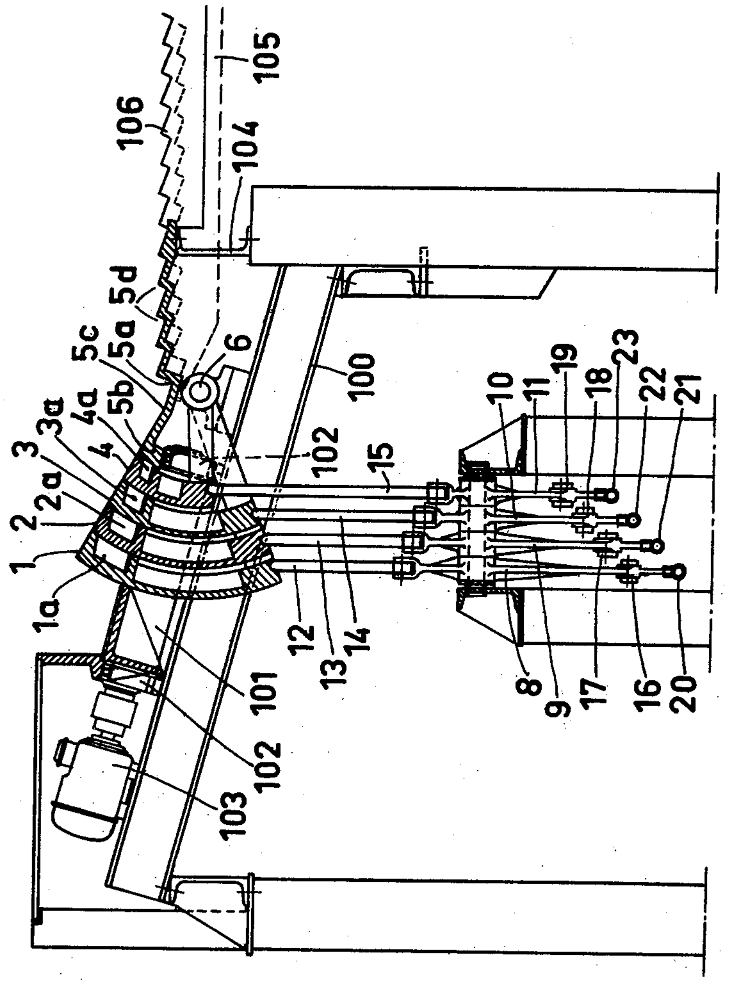
FIG. 1 shows a section through a group of channel forming members for a delivery roller table.
Figure 2:
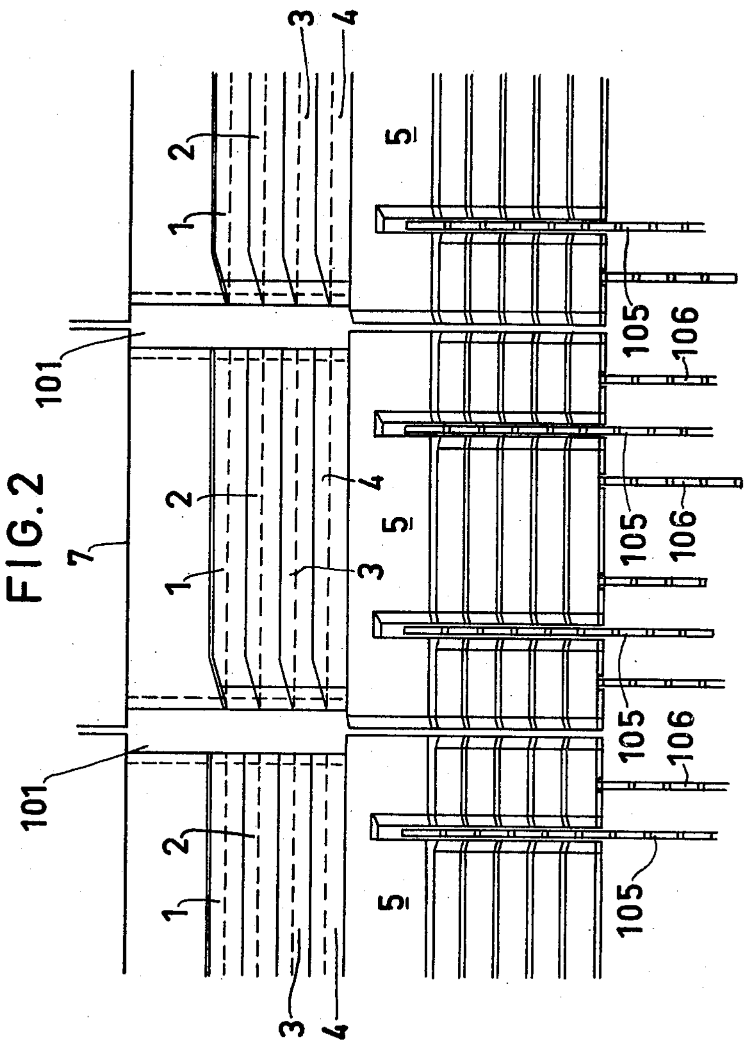
FIG. 2 is a schematical view of the same device as in FIG. 1 seen from above.
Figure 3:
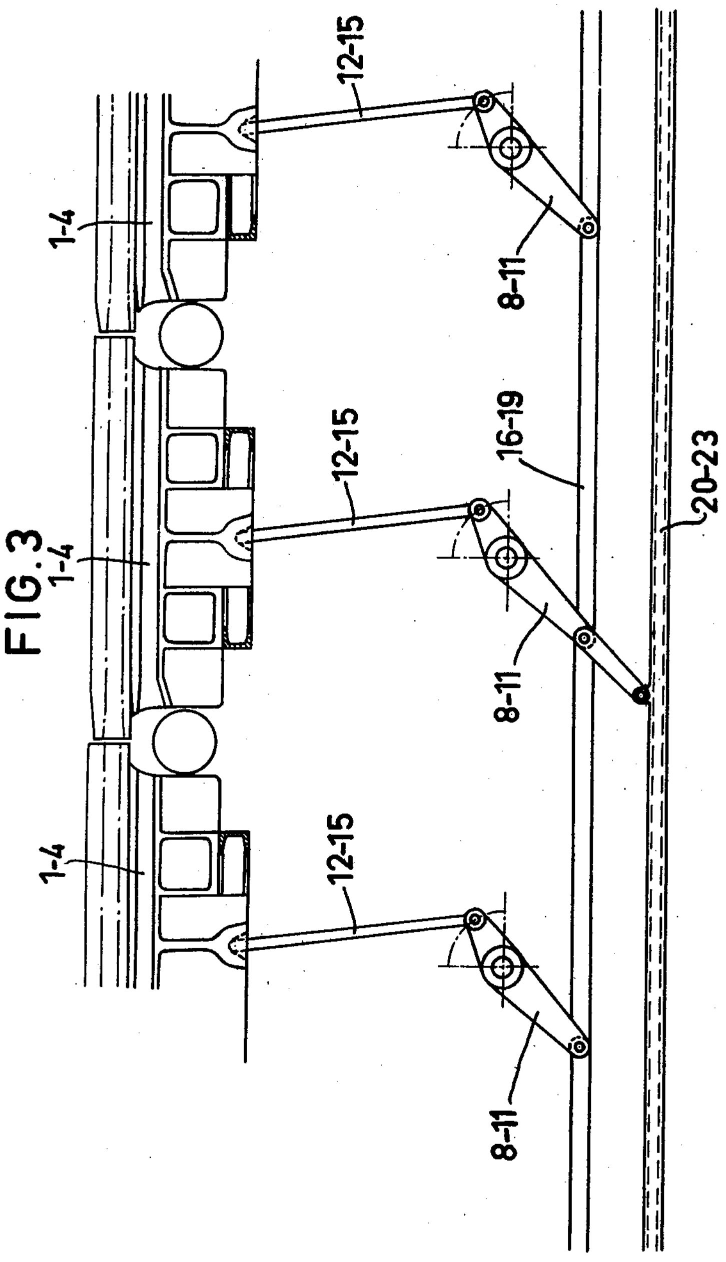
FIG. 3 is a side view of the same device as in FIG. 1.
Figure 4:
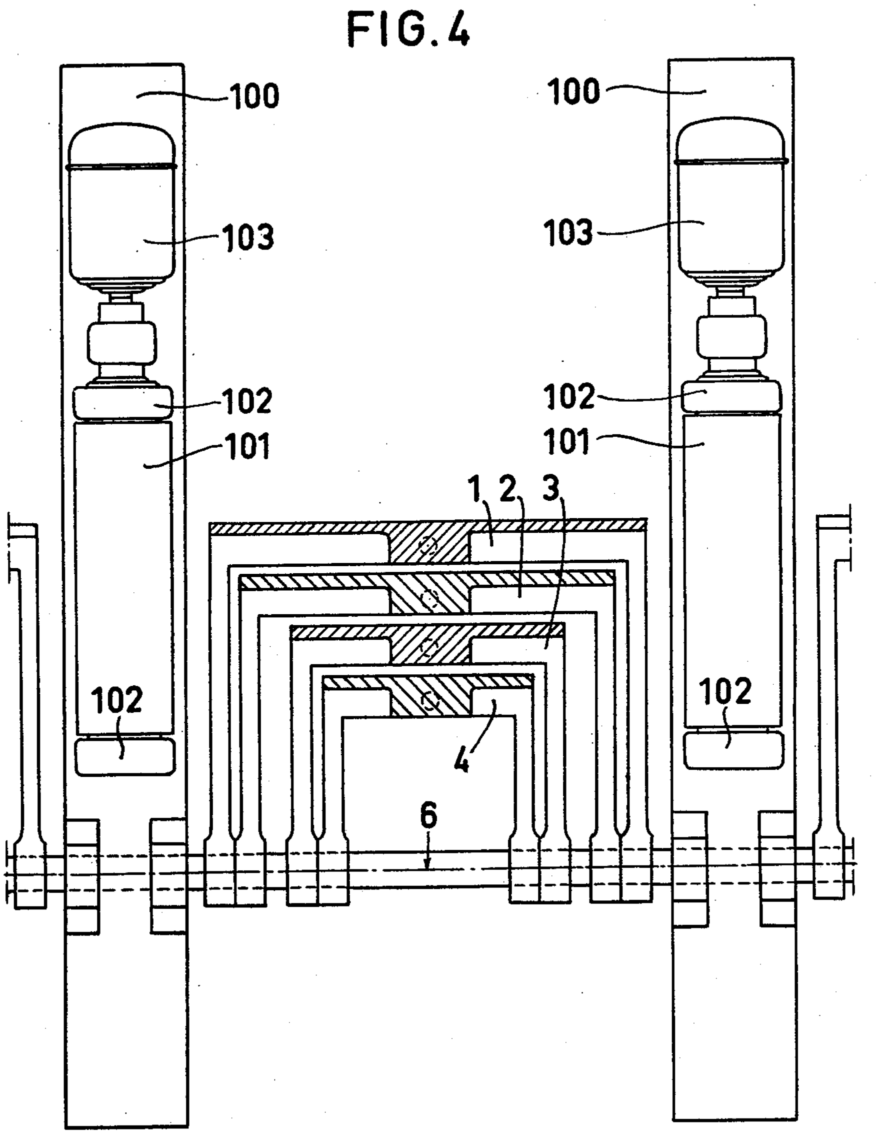
FIG. 4 shows a section through the channel forming members seen from above.

The delivery roller table shown in FIGS. 1–4 is on a beam 100 provided with a roller 101 carrying two bearing boxes 102 and a motor 103. In a central fulcrum 6 are supported the channel forming members 1, 2, 3 and 4 disposed in the spaces 7 to be raised and lowered by means of levers 8, 9, 10 and 11 and pressure rods 12, 13, 14 and 15. Said levers are raised and lowered by means of draw rods 16, 17, 18 and 19 connecting the levers 8–11 in the respective rows of channel forming members in sections of, for example, five rows of channel forming members and by the draw rods 20–23 connecting some or all of the sections along the full length of the roller table. The draw rods 20–23 are controlled by air cylinders or gears in known manner. The grate 105, FIGS. 1–2, is movable for conveying the material over the cooling bed. The grates 106, FIGS. 1–2, are fixed in the cooling bed.

According to this embodiment, the rollers 101 are inclined towards the cooling bed. The fulcrum 6 of the channel forming members lies on the same side of the channel forming members as the cooling bed. The rear side of the channel forming members intended for guiding the hot material is of convex shape. The hollow in the channel forming members *1a–3a* being open towards the cooling bed form together with the rear sides of the channel forming members 2–4 closed channel sections. The hollow *4a* forms in like manner a closed channel section together with the substantially vertical portion *5b* of the sliding member 5, said sliding member further comprising a slide or roller bed *5c* and a plurality of notches *5d*, the first notch being designated by *5a*.

Figure 5:
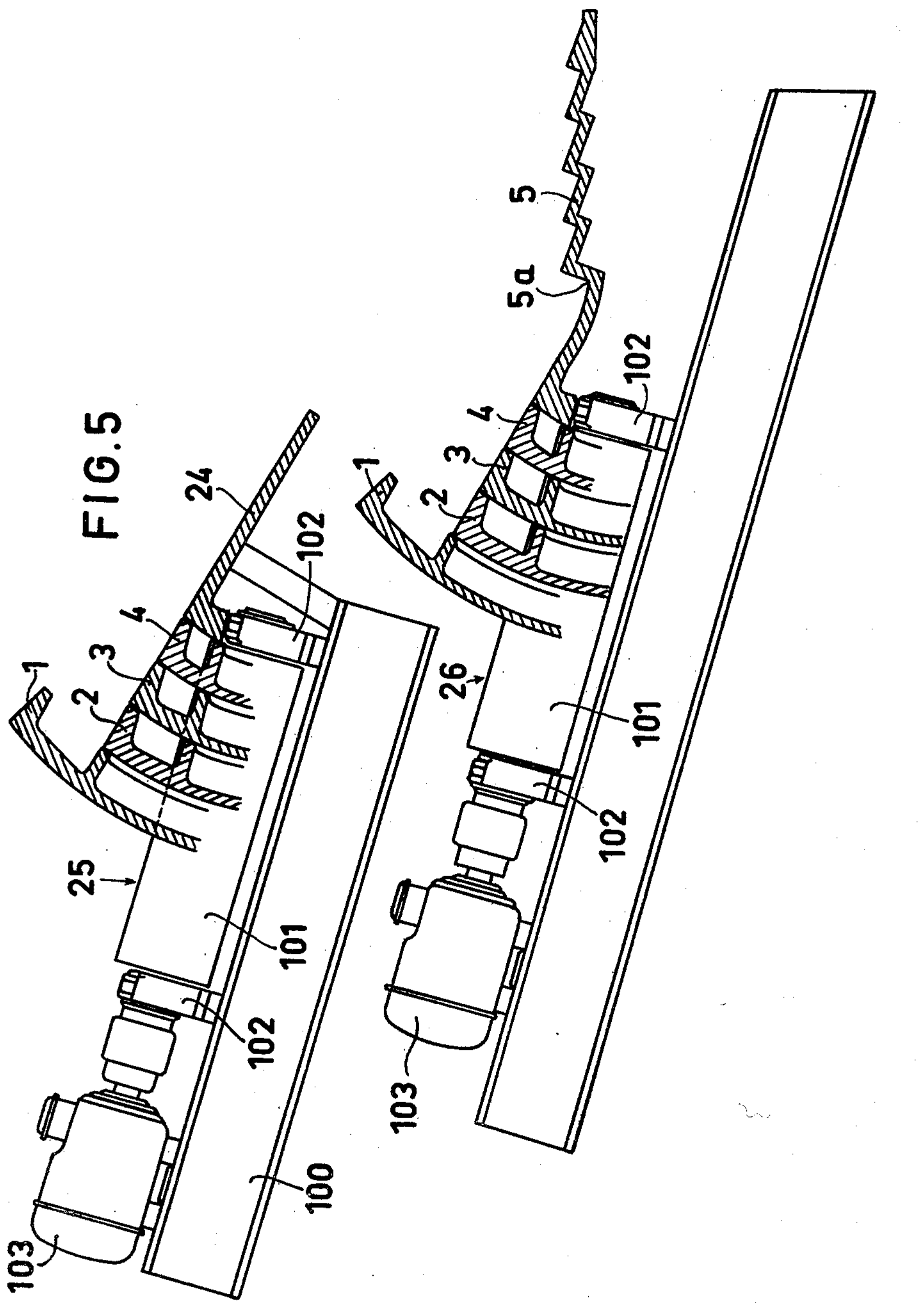
FIG. 5 shows a section through an embodiment comprising two delivery roller tables on different levels.

FIG. 5 shows an embodiment comprising two delivery roller tables 25, 26 arranged on different levels, the upper delivery roller table 25 being provided with a slide or roller bed 24 from which the cuttings of the hot rolling material slide down into said notch *5a*. This embodiment is particularly adapted for the simultaneous rolling of, for example, two strands of hot material in the last pair.

Figure 6:
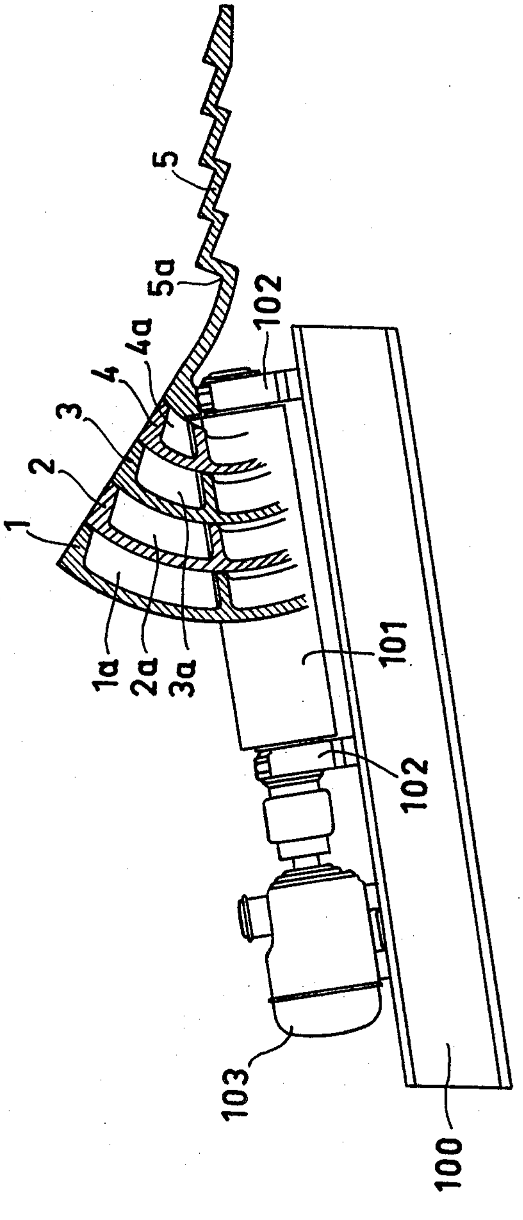
FIG. 6 shows a section through an embodiment in which the rollers are arranged in an oblique manner inclining in a direction opposite to the direction of the rollers according to FIGS. 1–5.

FIG. 6 shows an embodiment according to which the rollers 101 are inclined in the opposite direction. In this embodiment, the hot material or a section thereof is guided by the rollers 101 and by the (concave) inner surface of the side wall of the channel forming members.

Figures 7, 8:
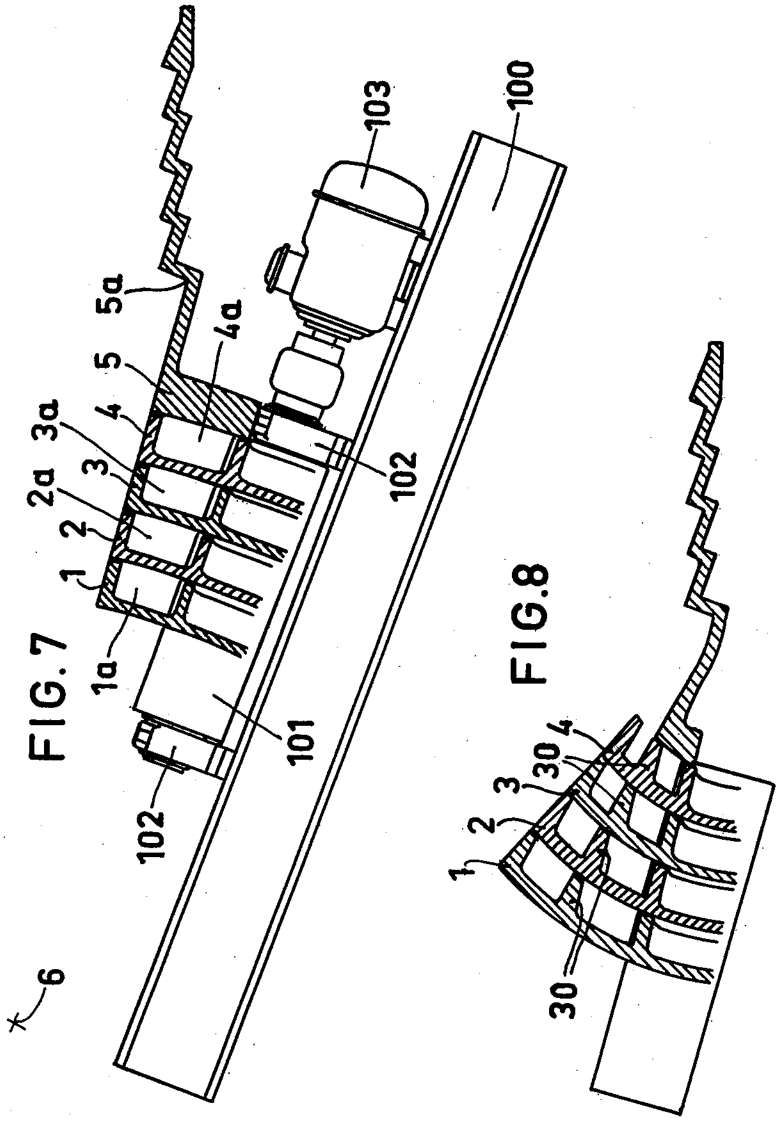
FIG. 7 shows a section through channel forming members according to an embodiment in which the sides of the channel forming members have concave shape.
FIG. 8 shows a section through channel forming members comprising channels on two different levels.

FIG. 7 shows an embodiment in which the fulcrum 6 of the channel forming members is placed in an opposite manner, i.e. the channel forming members are arranged between said fulcrum and the cooling bed.

FIG. 8 shows an embodiment comprising intermediate plates 30 in the channel forming members 1–4 distributing the wear in such a manner that the working life of the channel forming members is considerably increased.

Figure 9:
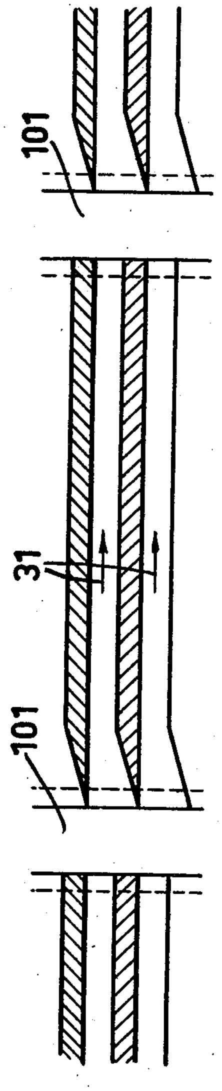
FIG. 9 shows a longitudinal section through a channel.

FIG. 9 shows a section through the channel forming members 1–4 on the channel level. It appears from this section that the front end portions of the channels in the direction of motion adjoining the rollers 101 are bevelled. The direction of motion is indicated by the arrows 31.

Figure 10:
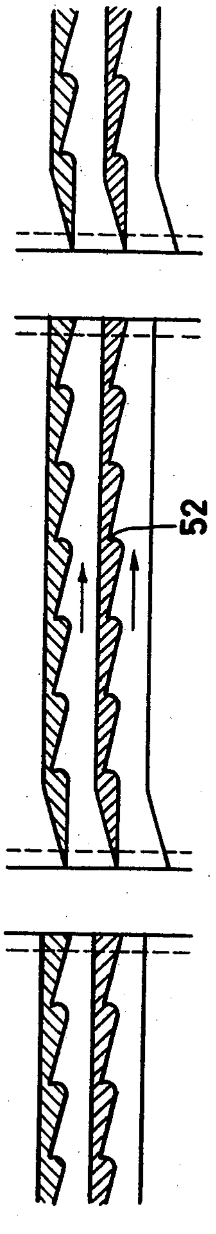
FIG. 10 shows a longitudinal section through a channel according to another embodiment.

FIG. 10 shows a section through the channel forming members 1–4 on the channel level, the channel forming members being provided with special hollows 32 for saving material and for cooling.

Figure 11:
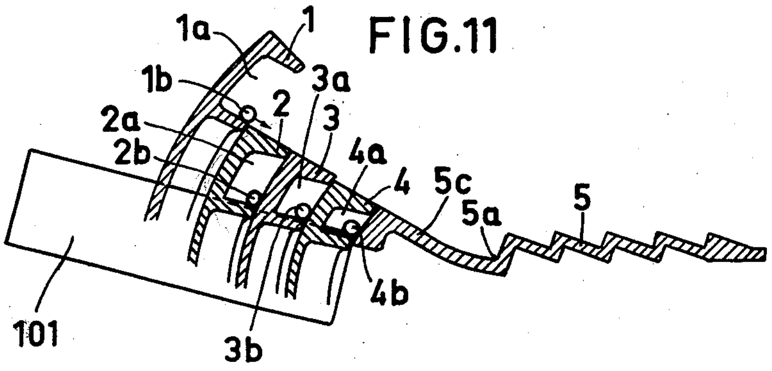
FIG. 11 shows a section through the channel forming members for illustrating the mode of the rolling operation according to an embodiment of the method.

FIG. 11 shows the mode of operation in connection with the use of the channels *1a–4a* intended to guide and confine the hot material or a section thereof during the run-out and braking period. The sections of the hot material confined in the channels *1a*, *2a*, *3a* and *4a* are designated by *1b*, *2b*, *3b* and *4b*. The hot material section *1b* confined in the channel *1a* was braked to standstill and is shown in the moment when it is just raised to be conveyed downwards to the first notch *5a* in the sliding member 5 in which the movable grates 105 get the material in known manner for conveying it over the cooling bed. The hot material slides or rolls on the upper surface of the channel forming members 2, 3 and 4 and on the slide bed *5c* of the sliding member 5. In the channel *2a* is confined the material *2b* during its braking, and in the channel *3a* the material *3b*. It appears from the figure that the bottom portions of the channels *2a* and *3a* are raised somewhat above the roller top level so that the material sections *2b* and *3b* respectively confined in said channels are braked. In the channel *4a* hot material is shown while it is just running out of the mill supported on and conveyed by the rollers 101. After the material *1b* has left the channel *1a*, the channel forming member 1 is lowered to its original position, the bottom of the channel *1a* being just below the roller top level. After said channel forming member 1 has reached its original position, another hot material section is fed into the channel forming member, a.s.o. During the same time, the hot material sections *2b*, *3b* and *4b* confined in the channels 2 and 3, and gradually also 4, were braked to standstill whereafter they are delivered via the channel forming members 3—4 and the slide bed *5c* of the sliding member 5 downwards to the notch *5a*. In the case of two-stranded rolling, the hot rolling material section 1, for example, runs into the channel *1a*, the section 2 into the channel *2a*, a.s.o., indifferently of the material from which the sections are cut off.

When rolling material at high speeds, it is important that during the run-out periods into the channels *1a*, *2a*, *3a* and *4a* the height of the channel bottoms is adjusted in relation to the tops of the rollers 101. This adjustment can be obtained by means of a slight motion of the draw rods 20–23, the draw rods 16–19 and the levers 8–11 wtih the pressure rods 12–15. The different rows of channel forming members 1, 2, 3 and 4 may, of course, be raised or lowered individually, but it also is possible, when desired, to connect all of them or in pairs mechanically in such a manner that they are raised or lowered in an automatic manner. It further is obvious, that the channel forming members may be raised or lowered by means other than those shown in FIGS. 1 and 2, for example by means of eccentric shafts. Owing to the fact that the channel forming members can be adjusted to various levels, there is less risk that the run of the hot material is disturbed. As a result thereof, the material can be directed into the channels with high speed. As shown in FIG. 8, the channels may, of course, also be provided with several decks in order to distribute the frictional wear.

Figure 12:
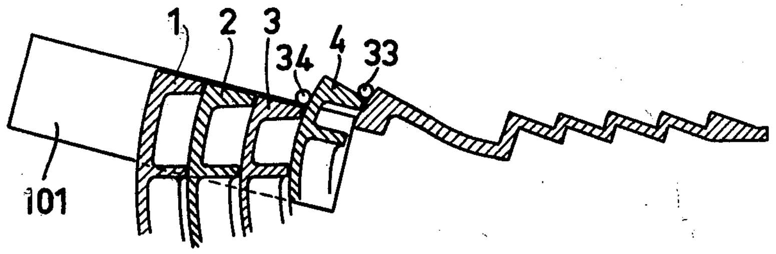
FIG. 12 shows a section through the channel forming members for illustrating the mode of the rolling operation according to another embodiment of the method.

FIG. 12 shows the mode of operation when the upper surfaces of the channel forming members are utilized, the upper surfaces of the channel forming members 1, 2 and 3 lying on an level lower than that of the roller top 101. The hot material section 33 is just in its braking period, the channel forming member 4 is raised and the hot material 34 is just running out from the mill. Also in this case the height relation between the roller top 101 and the upper surface of the channel forming members 1, 2 and 3 can be adjusted in such a manner that the best conditions for an undisturbed run-out of the hot material on the rollers are obtained. It is obvious, that this method is not limited to the use of the channel forming member 4 but that any channel forming member may be used for this rolling method. By applying the channel forming members 1–4 in pairs, two at a time or all at the same time, thick dimensions can be delivered to the notch *5a*.

Figure 13:
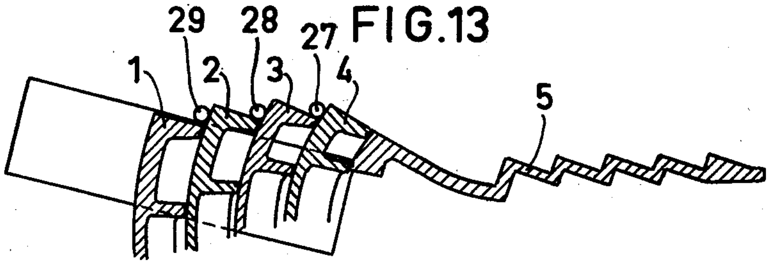
FIG. 13 shows a section through the channel forming members for illustrating the mode of the rolling operation according to a third embodiment of the method.

FIG. 13 shows the channel forming members 1, 2, 3 and 4 in different positions with the hot material sections 27, 28 and 29, the sections 27 and 28 being in the braking period and the material strand 29 just running out of the mill. Thus the braking occurs in the angles formed between the channel forming members 3 and 4 and the channel forming members 2 and 3 respectively. It is, of course, possible in this case to utilize also the radial surface of the notch 5 as braking area in the angle between the channel forming members 4 and the notch 5 formed by lowering the channel forming members 4 somewhat. It is of course further possible for this rolling to use only two or three channel forming members.

Figure 14:
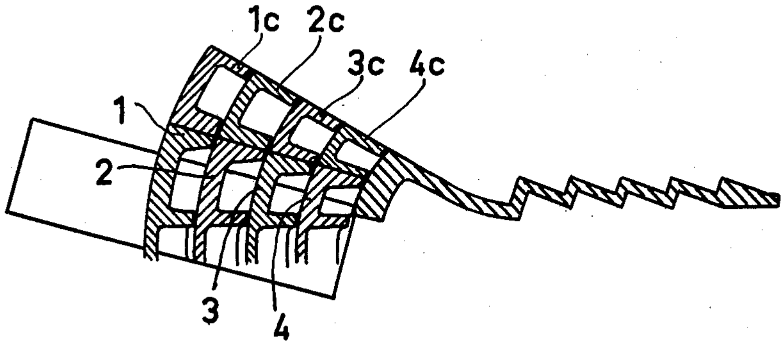
FIG. 14 shows an embodiment in which the channel forming members are provided with special additional channels attached to the channel forming members.

In FIG. 14 the channel forming members 1, 2, 3 and 4 are shown with bars screwed on in which channels **1*c*, 2*c*, 3*c* and 4*c* are provided. Said channels which also are indicated with dash-dotted lines in FIG. 2, can be applied to rolling thin dimensions at relatively high speeds. When said channels 1*c*–4*c* are provided on the channel forming members 1–4, the channel forming members cannot be used for rolling according to the descriptions in connection with FIGS. 12 and 13. When desired, only two or three of the channel forming members 1–4 may be provided with said channels in which case one or both the outer channels function in the aforedescribed manner. The channels 1*c*–4*c* may, of course, also be made in one piece with the channel forming members 1–4**, but in that case the channel forming members cannot longer be used in a universal manner.

Figure 15:
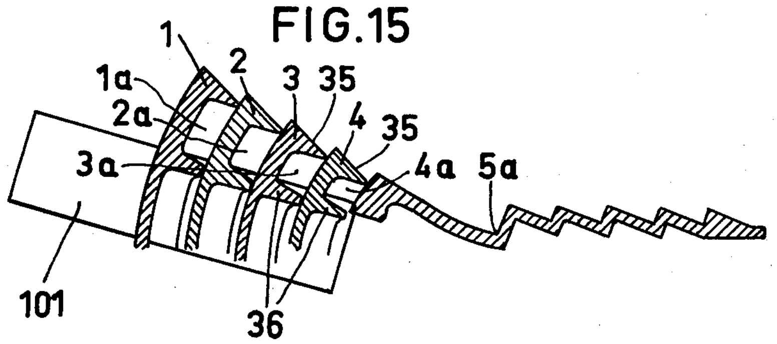
FIG. 15 shows a section through channel forming members having a special form of their upper surfaces.

FIG. 15 shows an embodiment in which the channel forming members 1–4 have inclined upper surfaces 35 and inclined bottoms 36 in the channels *1a–4a*. By raising and lowering the channel forming members the hot material sections are advanced successively to the notch *5a* in the angles formed by said inclined upper surfaces. It is obvious that the bottoms in the channels **1*a*–4*a*** must not have inclined shape, particularly not when the rollers are arranged in an oblique, inclined or conical manner.

It further is obvious that the construction is not limited to 4 movable channel forming members 1–4 according to the specification, but may comprise a greater as well as a smaller number of channel forming members. Furthermore, the rollers 101 may be designed to be conical to all their length or within the width of the respective channel forming member. The rollers may also be provided with grooves to effect better engagement and less openings which are formed at the rollers in connection with raising the channel forming member 1–4.

In the following one example of different methods of rolling one- and two-stranded material is described.

When rolling one-stranded hot material on conventional cooling beds with one row of channel forming members at a rolling speed of 12 m./s., the cooling beds must have the following minimum lengths provided that the hot material is braked to standstill on the channel forming member when it is raised above the roller top level. The friction coefficient assumed to be $\eta=0.3$ the braking time is as follows:

$$\frac{Q}{g}\times 12=0.3Q\times t$$

$Q$=weight of the hot material section
$g$=acceleration due to gravity
$t$=time
resulting in the time $$t=\frac{12}{9.82\times 0.3}=4.1 \text{ sec.}$$

When the motion of the channel forming member from standstill position to delivery position and back to original position is assumed to take one second, a theoretical time of 5.1 seconds is obtained between each hot material section. During 5.1 seconds the hot material can run out of the mill $12\times 5.1=61$ m. Consequently, a theoretical cooling bed length of at least 61 m. is required. One stranded rolling is also carried out on cooling beds of conventional construction with two run-out channels, for example on delivery roller tables as described in German Patent 719,-431. In that case, the shortest possible theoretical cooling bed length is half the length of 61 m.=30.5 m. For economical and practical reasons, cooling beds of this construction do not have more than two run out channels per roller table. According to the invention, four or more channel forming members can be installed easily in the same roller table. The cost calculation shows that a roller table according to the invention with four run out channels costs about as much as a roller table of the conventional type with two run out channels. Said four channels render it possible to reduce the cooling bed length to 15.25 m. but to receive the same production as a one-stranded cooling bed with a length of 61 m. and as a two-stranded cooling bed with a length of 31 m. In other words, compared with previously known delivery roller tables having the channels arranged on the same roller table, the production to the cooling bed can be doubled without increasing the investment costs beyond the costs required for increasing the speed of the cooling bed. By confining the hot material in the channels *1a–4a* and guiding it therein, the rolling speeds can be increased from 12 m./s. to for example 24 m./s. which means double production capacity. In that case, however, the length of the delivery roller table before the cooling bed must be increased accordingly in order to obtain sufficient braking length. The aforesaid is likewise true with two-stranded rolling, rendering it possible to reduce the cooling bed length to half the length required for the abovementioned two-stranded delivery roller tables.

What I claim is:

Apparatus for manipulating hot rolling material on a delivery roller table and conveying it to a cooling bed having a slide member with a vertical wall, said delivery roller table substantially comprising rollers arranged with their longitudinal axes in one common plane; a series of individually raisable and lowerable channel forming members provided immediately adjacent to each other in the gaps between substantially all of the rollers; a lever system for raising and lowering said channel forming members individually in the series, to effect roll-out and braking operations, respectively; the channel forming members of the series being concentrically arcuate in form and pivoted at their common center intermediate the delivery roller table and the slide member of the cooling bed; each channel forming member being provided with at least one hollow defined by a top a bottom and a side wall and each such hollow together with the side wall of the adjacent channel forming member or the substantially vertical portion of said adjacent slide member forming a closed channel and the upper surfaces of the top members of each of said channel forming members being substantially plane and serving for guiding the hot rolling material.

References Cited in the file of this patent

UNITED STATES PATENTS

| | | |
|---|---|---|
| 2,818,967 | Bogle | Jan. 7, 1958 |

FOREIGN PATENTS

| | | |
|---|---|---|
| 470,535 | Germany | Jan. 19, 1929 |
| 491,879 | Germany | June 5, 1930 |
| 534,969 | Germany | Sept. 30, 1931 |
| 762,843 | Germany | Aug. 10, 1953 |